United States Patent Office 3,808,282
Patented Apr. 30, 1974

3,808,282
BERYLLIUM HYDRIDE COMPOUNDS
Louis R. Grant, Jr., Los Angeles, and Frank C. Gunderloy, Jr., Santa Susana, Calif., assignors to North American Rockwell Corporation
No Drawing. Filed Oct. 3, 1966, Ser. No. 584,017
Int. Cl. C07f 3/00
U.S. Cl. 260—665 R    7 Claims

ABSTRACT OF THE DISCLOSURE

The invention is to a method of preparing alkyl, aryl, aryl substituted alkyl or alkyl substituted aryl beryllium hydrides by reacting dialkyl beryllium, diaryl beryllium, di(aryl substituted alkyl) beryllium or di(alkyl substituted aryl) berryllium with metathetical beryllium hydride. The compounds are useful in rocket propellants.

---

This invention relates to the preparation of beryllium hydride compounds. More especially, this invention relates to the preparation of alkyl, aryl, aryl substituted alkyl, and alkyl substituted aryl beryllium hydrides.

Alkyl, aryl, aryl substituted alkyl, and alkyl substituted aryl beryllium hydrides are useful as fuels in solid rocket propellant compositions. Further, they are useful as intermediates in the preparation of beryllium hydride liquid fuels, for liquid rocket propellants. In the prior art, alkyl, aryl, aryl substituted alkyl, and alkyl substituted aryl hydrides have been prepared by the reaction, in ether, of lithium aluminum hydride and dialkyl, diaryl, di(aryl substituted alkyl) or di(alkyl substituted aryl) beryllium. This reaction produces alkyl, aryl, aryl substituted alkyl, or alkyl substituted aryl beryllium hydrides that are partially solvated.

A similar prior art reaction involves dialkyl, diaryl, di(aryl substituted alkyl) or di(alkyl substituted aryl) beryllium and a beryllium halide in the presence of lithium hydride, in ether. This reaction also produces alkyl, aryl, aryl substituted alkyl, or alkyl substituted aryl beryllium hydrides that are partially solvated. Residual solvent in the alkyl, aryl, aryl substituted alkyl, or alkyl substituted aryl beryllium hydrides is not desirable since it decreases the purity of the product, and therefore makes it less energetic. High energy content must be maintained in rocket propellant formulation.

It is, therefore, an object of this invention to provide improved processes for the preparation of alkyl, aryl, aryl substituted alkyl, or alkyl substituted aryl beryllium hydrides.

It is a further object of this invention to provide processes for the preparation of alkyl, aryl, aryl substituted alkyl, or alkyl substituted aryl beryllium hydride that is not solvated, or complexed.

Additional objects will become apparent from the following description of the invention.

The objects of the present invention are accomplished by a process which comprises reacting dialkyl, diaryl, di(aryl substituted alkyl) or di(alkyl substituted aryl) beryllium with metathetical beryllium hydride. Metathetical beryllium hydride and its preparation and properties are revealed in assignee's co-pending U.S. application, Ser. No. 455,676, now U.S. Pat. No. 3,574,563. The reaction of the instant invention can be described by the equation:

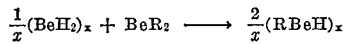

where $x$ denotes an indeterminate but small number, such that the beryllium hydride is a short-chain polymer, and R is an alkyl, aryl, aryl substituted alkyl, or alkyl substituted aryl radical.

Generally, the alkyl must contain from one to eight carbon atoms, and may be straight or branched. Methyl and ethyl are preferred species. Suitable aryl radicals contain from 6 to 10 carbon atoms, and include phenyl, tolyl, and napthyl. Phenyl is the preferred species. The aryl radicals can be substituted with as many as three additional carbon atoms. The alkyl radicals can be substituted with aryl radicals containing from 6 to 10 carbon atoms. Examples of suitably substituted aryl radicals are phenyl, tolyl, and napthyl.

The above reaction occurs in the liquid state, at normal pressures. The reaction takes place between 0° C. and 100° C. and takes from about 1 to 96 hours. If the reaction involves the solid dialkyl beryllium, i.e., dimethyl beryllium, or a solid diaryl beryllium, it should be conducted in a dry solvent, such as dried toluene. Care must be taken to exclude water from the system, as hydrolysis will result. Indeed, the reactants of the instant invention are so active that if the reaction takes place in the presence of any Lewis base, or in the presence of an organic group that is readily reduced, undesirable side reactions occur. Accordingly, ethers, chlorinated hydrocarbons, amines, alcohols, ketones, aldehydes, sulfates, etc., are undesirable solvents. Desirable solvents can be described as aliphatic or aromatic hydrocarbons, such as benzene, toluene, hexane, kerosene, etc. It may be noted that if the reaction of the instant invention involves the use of the dialkyl beryllium homologs higher than dimethyl, such as diethyl beryllium, a solvent is optional, since the higher homologs are liquid. After reaction, the reaction mixture can be filtered and the filtrate concentrated by means known in the art, such as vacuum distillation.

The reaction is a safe, stable one and no special precutions or apparatus are required. However, it has been surprisingly found that the reaction will not take place at any appreciable rate if pyrolytic beryllium hydride is used. Pyrolytic beryllium hydride is that berryllium hydride produced by the pyrolysis of di-tertiary butyl beryllium etherate. Such a pyrolytic beryllium hydride is sold under the trade name, "Beane," by Ethyl Corp. It is hypothesized that pyrolytic beryllium hydride is unsatisfactory due to its long chain structure. Metathetical beryllium hydride, on the other hand, appears to have a shorter chain length than pyrolytic beryllium hydride and therefore is more reactive.

EXAMPLE I

Preparation of 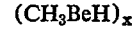

To an all glass, two-compartment reactor joined by a medium porosity fritted disc was added 10.2 mmoles of resublimed $(CH_3)_2Be$, 0.18 gram of 69.3 percent pure metathetical $BeH_2$ and 40 ml. of $LiAlH_4$ dried toluene. The system was degassed, and heated at 50–55° C., while stirring, for 20 hours.

The reaction mixture was filtered and the filtrate concentrated in vacuo. The white solid recovered from the filtrate was then dried at 50° C. for one hour. The product $(CH_3BeH)_x$ recovered weighed 0.43 gram.

Hydrolysis of a 0.0148 gram sample yielded 0.59 mmole of $CH_4$, 0.50 mmole of $H_2$, and the hydrolysate was found to contain 5.4 mg. of beryllium. The purity of the $$(CH_3BeH)_x$$

was therefore 86 percent, with the impurity being unreacted $(CH_3)_2Be$.

Like results can be achieved when using di(2-ethyl butyl) beryllium or dioctyl beryllium, for example, as the starting material to yield 2-ethyl butyl beryllium hydride or octyl beryllium hydride, respectively.

EXAMPLE II

Preparation of $(C_2H_5BeH)_x$ 0.189 gm., 11 mmoles of 65 percent metathetical beryllium hydride prepared from the reaction of $Al(C_2H_5)_3$ and $Be(BH_4)_2$ was added to a round-bottom reactor fitted with a Fischer-Porter needle valve. 0.752 gm., 11.2 mmoles diethyl beryllium, and 25 ml. of $CaH_2$-dried toluene were then added to the reactor. After degassing the solid-liquid mixture on a vacuum system, the mixture was heated at 50° C., with stirring, for 3 days. After this period of time, only a trace of insoluble solid remained. The reaction mixture was filtered and the filtrate concentrated by vacuum distillation to yield 0.880 gm. of a colorless crystalline solid. A sample of the solid was analyzed in the following manner. The solid was hydrolyzed and the gases evolved measured in a calibrated Toepler system. Mass spectrographic analyses of the gases showed the presence of $H_2$ and $C_2H_6$. Beryllium was determined in the hydrolysate. The $H_2$, $C_2$, $H_6$, and Be were found to be present in approximately equal molar amounts. These analytical results, closely approximating the theoretical, indicated the reaction product to be $(C_2H_5BeH)_x$.

A similar reaction procedure employing diphenyl beryllium in the place of diethyl beryllium results in the production of phenyl beryllium hydride. Similarly, ditolyl beryllium produces tolyl beryllium hydride. The substituted compound di(propylphenyl) beryllium similarly produces propylphenyl beryllium hydrides and the substituted compound di(tolylethyl) beryllium produces tolylethyl beryllium hydride.

Since it is obvious that many changes and modifications can be made in the above-described details without departing from the nature and spirit of the invention, it is to be understood that the invention is not to be limited thereto except as set forth in the appended claims.

We claim:

1. The process of producing a compound selected from the group consisting of alkyl beryllium hydrides, aryl beryllium hydrides, aryl substituted alkyl beryllium hydrides, and alkyl substituted aryl beryllium hydrides comprising:

reacting a beryllium compound selected from the class consisting of dialkyl beryllium, wherein the alkyl contains from 1 to about 8 carbon atoms, diaryl beryllium, wherein the aryl contains from 6 to 10 carbon atoms, di(aryl substituted alkyl) beryllium, wherein the alkyl contains from 1 to about 8 carbon atoms and is substituted with from 6 to 10 carbon atoms, and di(alkyl substituted aryl) beryllium, wherein the aryl contains from 6 to 10 carbon atoms and is substituted with from one to three carbon atoms, with metathetical beryllium hydride;

maintaining a reaction temperature of between about 0° C. and 100° C.;

and separating the resultant beryllium hydride compound.

2. The process of claim 1 wherein the reaction takes place in a dried aliphatic solvent.

3. The process of claim 1 wherein the reaction takes place in a dried aromatic solvent.

4. The process of claim 3 wherein the beryllium compound is dimethyl beryllium and the solvent is toluene.

5. The process of claim 1 wherein the beryllium compound is diethyl beryllium.

6. The process of claim 1 wherein the beryllium compound is diphenyl beryllium.

7. The process of claim 1 wherein the reaction period of between 1 and 96 hours is used.

References Cited

Mackay, Hydrogen Compounds of the Metallic Elements, E & F Spon Ltd., London, 1966, pp. 105–107 and 132.

Everest, The Chemistry of Beryllium, vol. I, Elsevier Pub. Co., New York, 1964, pp. 91–101.

LELAND A. SEBASTIAN, Primary Examiner

U.S. Cl. X.R.

149—109